United States Patent [19]

Murphy

[11] 4,329,277

[45] May 11, 1982

[54] ANTIFOULING POLYURETHANES

[75] Inventor: Walter T. Murphy, Cuyahoga Falls, Ohio

[73] Assignee: The B. F. Goodrich Company, Akron, Ohio

[21] Appl. No.: 193,700

[22] Filed: Oct. 3, 1980

[51] Int. Cl.$^3$ ............................................... C08K 5/16
[52] U.S. Cl. ................................... 523/122; 524/725; 524/873; 524/874; 524/875; 524/590; 524/208
[58] Field of Search ............... 260/45.9 KA; 424/304; 521/126

[56] References Cited

U.S. PATENT DOCUMENTS

| | | | |
|---|---|---|---|
| 3,006,870 | 10/1961 | Steinfatt et al. | 260/45.75 C |
| 3,278,371 | 10/1966 | Ugi et al. | 424/304 |
| 3,331,735 | 7/1967 | Battershell et al. | 424/304 |
| 3,392,128 | 7/1968 | Hostettler et al. | 521/126 |
| 3,456,055 | 7/1969 | Galloway | 424/304 |
| 3,592,910 | 7/1971 | Clark et al. | 424/304 |
| 3,819,576 | 6/1974 | Seltzer et al. | 260/45.75 S |

*Primary Examiner*—V. P. Hoke
*Attorney, Agent, or Firm*—J. Hughes Powell, Jr.

[57] ABSTRACT

Polyurethane formulations that are resistant to fouling by marine organisms when exposed to sea water are prepared by mixing tetrachloroisophthalonitrile with a polyurethane. Any of the known polyurethanes may be used and liquid castable compositions are particularly useful.

10 Claims, No Drawings

ANTIFOULING POLYURETHANES

BACKGROUND OF THE INVENTION

The prevention of fouling by barnacles and other fouling genera commonly present in sea water, particularly on ship hulls and other marine applications including buoys, pier pilings, oil well rigs, undersea pipelines and the like is a continuing problem. In recent years some success has been obtained by the use of certain organo-tin compounds in certain elastomers which are not degraded or the physical properties substantially impaired by the presence of the organo-tin compound. Types of these applications are described in U.S. Pat. No. 3,426,473 wherein coverings resistant to marine fouling organisms are prepared from vulcanized natural rubber, neoprene, butyl rubber or nitrilebutadiene rubbers that contain bis-(tri-n-butyl tin-oxide). Typical applications for use, for example, in sonar bow domes are very labor intensive and the installation involves the hand lay up of quarter inch plies of green neoprene stock in amounts up to 8 inches in thickness, after which the dome must be transferred to a curing oven. This is an awkward operation since the amount of neoprene rubber used per dome is many thousands of pounds. Attempts to use polyurethanes, which may be applied in solid layers, or more preferably by casting, have been unsuccessful because bis(tri-n-butyl tin-oxide) severely degrades the polyurethane.

SUMMARY OF THE INVENTION

Antifouling polyurethane formulations are prepared by mixing tetrachloroisophthalonitrile with said polyurethane in an amount greater than 2 weight parts per hundred of polyurethane. Any polyurethane may be used, and liquid castable compositions of a polyurethane containing the tetrachloroisophthalonitrile are especially valuable for ease of application for casting without requiring the expensive hand labor ply lay up. These polyurethane compositions have excellent antifouling properties and sound wave propagation that matches sea water that is necessary for sonar application.

DETAILED DESCRIPTION

In accordance with this invention, polyurethanes including polyesterurethanes, polylactoneurethanes, polyetherurethanes, polyhydrocarbonurethanes and the like are contemplated. The polyurethanes are readily prepared from a variety of compounds having terminal functional groups reactive with organic polyisocyanates. Normally used are hydroxyl-terminated compounds having molecular weights greater than about 300 to 400 to 10,000. A great variety of such macropolyols and macropolyamines have been prepared and proposed for commercial applications as elastomers. The most commonly used macropolyols are hydroxyl-terminated polyesters, polyethers, polyacetals, polylactones, polybutadienes and polyacrylates. In the preparation of one type of elastomeric material, such macropolyols, alone or in admixture, having molecular weights greater than about 400, and optionally, with polyfunctional chain extenders or cross-linkers, such as polyols or amines, are reacted with the organic polyisocyanate. Useful materials are obtained by reacting an organic diisocyanate with a mixture of a macroglycol and a small polyfunctional chain extender or cross-linker such as an alkylene glycol or ether glycol, a cycloaliphatic glycol, or an aromatic-aliphatic glycol; a triol as trimethylol propane and the like; or the so-called prepolymer technique may be used where an excess of organic diisocyanate is first reacted with the macroglycol and then the small polyfunctional or difunctional chain extender or cross-linker added, normally in amounts equivalent to react with substantially all of the free isocyanate groups. The hydroxyl (polyalkylene oxide), or polyether macroglycols preferably are essentially linear hydroxyl-terminated compounds having ether linkages as the major linkage joining carbon atoms. The molecular weights may vary between about 400 and 10,000, usually to about 5,000. The hydroxyl(polyalkylene oxide)s found useful include hydroxyl poly(methylene oxide)s as hydroxyl poly(tetramethylene oxide), hydroxyl poly(trimethylene oxide), hydroxyl poly(hexamethylene oxide), hydroxyl poly(ethyllene oxide) and the like of the formula $HO[(CH_2)_nO]_xH$ wherein n is a number from 2 to 6 and x is an integer, and alkyl substituted types such as hydroxyl poly(1,2-propylene oxide).

The hydroxyl polyester macroglycols include linear hydroxyl-terminated polyesters having molecular weights between about 400 and 10,000, usually about 5,000. The polyesters utilized include those prepared by the polyesterification of aliphatic dicarboxylic acids including for example, malonic, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 1 to 10 carbon atoms, preferably 4 to 6 carbon atoms. The phthalic acids are also useful. The glycols used in the preparation of the polyesters by reaction with the dicarboxylic acids are normally aliphatic polyols containing between 2 and 10 carbon atoms such as ethylene glycol, propanediol, butanediol, hexamethylene glycol, decamethylene glycol, 2-ethylhexanediol-1,6-neopentyl glycol and the like; and aromatic polyols as bis-1,4($\beta$-hydroxyethoxy)-benzene; and triols such as glycerol, trimethylol propane and the like. Polyesteramides also are contemplated, usually by substitution of a diamine or amino alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX-R-XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene glycol and the like. Ethylene glycol provides excellent polyesters.

The lactones preferred for preparing the polyesters are epsilon-caprolactones having the general formula

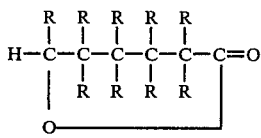

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, α-methyl-epsilon-caprolactone, B-methyl-epsilon-caprolactone, dimethyl-epsilon-caprolactone and the like. The lactones are polymerized readily by heating with the bifunctional reactant to a temperature of about 100° to about 200° C. Catalysts may be employed if desired. Particularly preferred are poly(epsilon-caprolactone)diols having molecular weights in the range of about 400 to about 10,000, normally to about 5,000.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and the like reacted with glycols; for example, ethylene glycol, trimethylol propane, hexanediol, diethylene glycol, and the like which are well known to those skilled in the art. Generally, the polyacetals may be considered to be reaction products of aldehydes and glycols. The molecular weights of the polyacetal will be varied from about 400 to about 10,000, normally to about 5,000.

Typical poly(hydrocarbonurethanes) useful in the practice of the invention are made from hydroxyl-terminated liquid polymers having an aliphatic polymeric backbone prepared by polymerizing at least one vinylidene monomer having at least one terminal

group per monomer molecule together with at least one hydroxyl containing disulfide as is described in U.S. Pat. No. 4,120,766; or amine-terminated liquid polymers are prepared by reacting a carboxyl-terminated, ester-terminated or acid chloride-terminated liquid polymer having a carbon-carbon backbone with at least one aliphatic, alicyclic, heterocyclic or aromatic amine containing at least two secondary or mixed primary/secondary amine groups, but no more than one primary amine group per molecule as is described in U.S. Pat. No. 4,133,957. Such liquid polymers may have a backbone derived from, for example, ethylene, isobutylene, butadiene, acrylate and methacrylate esters alone or with other vinylidene monomers such as styrene or acrylonitrile as is described in the aforementioned patents, the disclosures of which are incorporated herein and made a part hereof. Other methods for making hydroxyl containing liquid polymers are well known such as reacting an aminoalcohol with a liquid carboxyl terminated polymer having backbones of the type disclosed above. The molecular weight of these materials will range from about 400 to 5,000.

Cross-linkers or chain extenders include polyols or polyamines containing at least two functional groups. Particularly useful cross-linkers are those containing at least three functional groups, for example three hydroxyl groups, in order to obtain a tight cross-linked cure in the vulcanized products. Typical cross-linking materials include for example N,N'-tetrakis(hydroxyethyl)ethylenediamine, trimethylol propane and the like including 1,2,3-propanetriol, 1,2,3-butanetriol, 1,2,3,4-butanetetrol, trimethylol butane, tetrahydroxymethylmethane, penta- and hexa-hydric alcohols, mannitol, sorbitol, iditol, dulcitol and the like also may be used. The amount of these cross-linking agents normally will be from 0.1 mole to as high as 10 or more moles per mole of polyol or amine and more preferably about 0.2 to about 3 per 100 polyol or polyamine.

If small glycols are used as chain extenders with the macropolyols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol and the like. Cycloaliphatic glycols such as cyclohexanedimethanol, and aromatic-aliphatic glycols such as bis-1,4(β-hydroxyethoxy)benzene, may also be employed.

The amount of glycol chain extender used with the macropolyol and the diisocyanate may vary from about 0.1 to 10 mols per mol of macroglycol. Excellent polyurethanes are obtained with a molar ratio of one mole of macropolyol and 1 to 5 mols of the small chain extender glycol. Substituted glycols also may be used. If amines are used, they may be hindered aromatic amines such as methylene-bis-2-chloroaniline and the like. Other amines include aliphatic polyamine such as ethylene diamine, tetramethylene diamine, hexamethylene diamine, diethylene triamine, and triethylene tetramine preferably primary amines. The amounts used will be from 0.1 to 10 moles per mole of macropolyol.

The organic polyisocyanates which are reacted with the macropolyols or polyamines will include, for example, alicyclic aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, dibenzyl diisocyanate, diphenyl ether diisocyanates, bitolylene diisocyanates and the like, for example diisocyanates of the formula

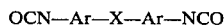

wherein Ar is an arylene radical and X may be a valence bond, an alkylene radical containing 1 to 5 carbon atoms, NR where R is an alkyl radical, oxygen, sulfur, sulfoxide, sulfone and the like.

About equimolar ratios of diisocyanate and/or polyamines or polyols may be used. When a small polyol or polyamine chain extender is also used, the ratio of reactants employed may be varied from about 1.5 to 13 mols of organic diisocyanate per mole of macropolyol with 0.5 to 12 mols of the polyol. The amount of organic diisocyanate used is dependent on the total amount of polyol chain extender or cross-linker and macropolyol and normally is a molar amount essentially equivalent to the total of these latter two reactants so that there are essentially no free unreacted isocyanate groups remaining in the polymer. However, to insure cross-linking when glycols are used, an excess of diisocyanate may be employed. Excellent polyurethanes have been obtained when a molar ratio of one mol of macropolyol of molecular weight about 800 to 4000, 0.1 to 3 mols polyol, and 2 to 4 mols of the diisocyanate are caused to react. While essentially equimolar amounts of isocyanate and active hydrogen groups are often preferred, it will be understood that an excess of any reactant, preferably less than 25%, as 6%, of excess organic diisocyanate can be used in forming propolymers. These, of course, have to be kept free of moisture until further reaction is desired.

Catalysts may be used to speed up the polyurethane formulation and any of those catalysts normally used by those skilled in the art may be employed. Typical catalysts include dibutyltin dilaurate, stannous octoate, tertiary amines such as triethylamine and the like may be used, normally in amounts from about greater than 0.01 up to 10 phr of polyurethane, and more normally greater than about 0.025 up to 5 phr.

The active tetrachloroisophthalonitrile will be present in amounts from greater than 2, preferably 3 to about 20 weight parts per 100 weight parts of polyurethane. A particularly useful range is from about 5 to 15 weight parts. In cast systems, the tetrachloroisophthalonitrile is added along with the other reactants in any order. The tetrachloroisophthalonitrile also may be mixed into solid polyurethanes as by milling in internal mixtures and the like.

The polyurethanes are readily prepared by any of the methods known to and used by those skilled in the art. Normally the reactants are mixed and heated as necessary to a temperature so that all of the reactants are molten and react readily. Such temperatures are normally in the range of about 50° to 150° C. The initial reactions are normally conducted in the absense of moisture such as under a vacuum. The final curing step may be conducted at room temperature or elevated temperatures as high as 120° C., or higher.

A typical formulation is:

| Materials | Parts by Weight | Reactant Mols |
|---|---|---|
| Poly (tetramethylene ether) glycol | 100.0 | 1.0 |
| trimethylol propane | 1.0 (1.0$^a$) | 0.5 |
| tetrachloroisophthalonitrile (75% pure) | 13.0 (10$^b$) | — |
| triethylenediamine (1:2 parts in ethylene glycol) | 1.13 (0.1$^b$) | — |
| tolylene diisocyanate | 25.5 | 1.50 |

$^a$weight parts per 100 of poly(tetramethylene ether) glycol.
$^b$weight parts per 100 of polyurethane.

All of the materials, except the tolylene diisocyanate, are mixed and heated at 120° C. under vacuum. This mixture was then cooled to 50° C. and mixed with the tolylene diisocyanate (80 weight percent 2,4- and 20 weight percent 2,6-). This mixture was then cast and cured at room temperature to form an elastomer. After 16 hours a good state of cure was obtained.

The resulting cast product has excellent physical properties. A typical polyurethane of this formulation had a tensile strength of 1280 psi, an elongation of 330%, a compression set after 22 hrs. at 158° F. of 1.6%, tear strength of 135 pounds per inch, a sound velocity in sea water in meters per second of 1520, density of 1.07, Shore A Hardness of 60, a water absorption after 48 hours at 25° C. of only 1.8% volume increase, and excellent ozone resistance. A satisfactory neoprene composition, for comparison, has a sound velocity in sea water of 1485 meters per second and a water absorption value of 8% volume increase.

To demonstrate the antifoul properties of this formulation, 6×6×0.075 inch molded slabs were prepared from polyetherurethanes containing about 0, 0.5, 1.0, 2, 5 and 10 weight parts of 75 percent pure tetrachloroisophthalonitrile per 100 weight parts of polyurethane. These slabs were exposed for six years in a sea water immersion test at Miami Beach, Fla. At the end of this period the samples were observed, and the sample containing 10 phr of the tetrachloroisophthalonitrile showed no fouling by barnacles. The sample with 2 phr of tetrachloroisophthalonitrile showed 3 medium barnacles. The sample with no tetrachloroisophthalonitrile showed 18 medium barnacles. Thus polyurethane formulations containing the tetrachloroisophthalonitrile in amounts greater than 2 phr are effective and satisfactory both as to sound and physical properties for sonar bow domes for examples, and have excellent resistance to fouling after long exposure in sea water.

Following this general procedure, other useful fouling-resistant polyurethane formulations are readily prepared from polyesterurethanes exemplified by reacting 1 mol of poly(tetramethyl adipate)glycol, 2,000 molecular weight, with 0.3 mol of 1,4-butane diol and 1.3 moles of diphenyl methane diisocyanate; from polylactoneurethanes; and polyhydrocarbonurethanes, such as those derived from hydroxyl-terminated butadiene or acrylate ester polymers having molecular weights around 2,500 and the other polyurethanes described and set forth hereinabove.

The castable formulations have many advantages over similar applications where, for example, neoprene gum stock containing the tributyl tin oxide is used in bow dome and other applications. In accordance with this invention, one is able to employ liquid casting rather than the hand lay up of thin plies and use room temperature curing as compared to elevated heat curing required for other elastomer stocks. Further, the resulting compositions have about 20% less density than neoprene.

I claim:

1. A polymeric composition resistant to fouling in sea water comprising a polyurethane elastomer containing greater than 2 weight parts of tetrachloroisophthalonitrile per 100 weight parts polyurethane.

2. A composition of claim 1 wherein said polyurethane is a polyetherurethane containing 3 to 20 weight parts of tetrachloroisophthalonitrile.

3. A composition of claim 2 wherein said polyetherurethane is prepared from a polyether glycol of molecular weights from about 400 to 5,000 reacted with a cyclic diisocyanate.

4. A composition of claim 3 wherein said polyether glycol has the formula HO[(CH$_2$)$_n$O]$_x$H wherein n is a number from 2 to 6 and x is an integer, said cyclic diisocyanate is an aromatic diisocyanate, said tetrachloroisophthalonitrile is present in amounts from 5 to 15 weight parts, and there is present a cross-linking agent.

5. A composition of claim 4 wherein said cross-linking agent is trimethylol propane and said reactants are present in a ratio of 1 mol of polyether glycol, 0.2 to 3 mols of trimethylol propane and 1.2 to 4.0 moles of aromatic diisocyanate.

6. A composition of claim 4 wherein said aromatic diisocyanate is a tolylene diisocyanate.

7. A composition of claim 2 wherein said polyurethane is prepared from a polyester glycol of molecular weights from about 400 to 5,000 reacted with a cyclic diisocyanate and a cross-linking agent.

8. A composition of claim 7 wherein said polyester is a polyester of a glycol containing 2 to 10 carbon atoms and a dicarboxylic acid of the formula HOOC—R—COOH wherein R is an alkylene radical containing 4 to 6 carbon atoms.

9. A composition of claim 2 wherein said polyurethane is prepared from a hydroxyl-terminated liquid polymer having an aliphatic polymeric backbone and a molecular weight from about 400 to 5,000 reacted with a cyclic diisocyanate and a cross-linking agent.

10. A composition of claim 9 wherein said hydroxyl-terminated liquid polymer is a hydroxyl-terminated butadiene polymer or a hydroxyl-terminated acrylate ester polymer.

* * * * *